United States Patent
Buchanan et al.

(10) Patent No.: US 6,832,978 B2
(45) Date of Patent: Dec. 21, 2004

(54) METHOD OF CONTROLLING A DUAL CLUTCH TRANSMISSION

(75) Inventors: Mark Buchanan, Rochester Hills, MI (US); Russell Lemon, Illawong (AU); Melissa Koenig, Howell, MI (US)

(73) Assignee: BorgWarner, Inc., Auburn Hills, MI (US)

(*) Notice: Subject to any disclaimer, the term of this patent is extended or adjusted under 35 U.S.C. 154(b) by 0 days.

(21) Appl. No.: 10/371,381

(22) Filed: Feb. 21, 2003

(65) Prior Publication Data

US 2004/0166990 A1 Aug. 26, 2004

(51) Int. Cl.[7] .............. B60K 41/02; G06F 17/00; G06F 19/00; G06F 7/00
(52) U.S. Cl. .............. 477/174; 477/181; 477/180; 701/66; 701/67
(58) Field of Search .............. 477/180–181, 477/174, 176; 701/66–68; 74/330, 335

(56) References Cited

U.S. PATENT DOCUMENTS

| | | | |
|---|---|---|---|
| 3,589,493 A | 6/1971 | Smith | 192/3.52 |
| 4,461,188 A | 7/1984 | Fisher | 74/330 |
| 4,513,631 A | 4/1985 | Koivunen | 74/360 |
| 4,544,057 A | 10/1985 | Webster et al. | 192/0.076 |
| 4,790,418 A * | 12/1988 | Brown et al. | 701/51 |
| 4,827,784 A | 5/1989 | Muller et al. | 74/330 |
| 5,259,476 A * | 11/1993 | Matsuno et al. | 180/197 |
| 5,609,067 A * | 3/1997 | Mitchell et al. | 74/336 R |
| 5,634,867 A * | 6/1997 | Mack | 477/86 |
| 5,662,198 A | 9/1997 | Kojima et al. | 192/87.11 |
| 5,711,409 A | 1/1998 | Murata | 192/87.11 |
| 5,720,203 A | 2/1998 | Honda et al. | 74/325 |
| 5,890,392 A | 4/1999 | Ludanek et al. | 74/331 |
| 5,915,512 A | 6/1999 | Adamis et al. | 192/3.61 |
| 5,950,781 A | 9/1999 | Adamis et al. | 192/3.61 |
| 5,966,989 A | 10/1999 | Reed, Jr. et al. | 74/331 |
| 5,979,257 A | 11/1999 | Lawrie | 74/335 |
| 6,006,620 A | 12/1999 | Lawrie et al. | 74/335 |
| 6,012,561 A | 1/2000 | Reed, Jr. et al. | 192/48.2 |
| 6,044,719 A | 4/2000 | Reed, Jr. et al. | 74/330 |
| 6,171,212 B1 * | 1/2001 | Reuschel | 477/86 |
| 6,286,381 B1 | 9/2001 | Reed, Jr. et al. | 74/336 |
| 6,364,809 B1 | 4/2002 | Cherry | 477/86 |
| 6,415,213 B1 * | 7/2002 | Hubbard et al. | 701/51 |
| 6,536,296 B2 * | 3/2003 | Sakamoto et al. | 74/325 |
| 6,715,597 B1 * | 4/2004 | Buchanan et al. | 192/70.12 |

FOREIGN PATENT DOCUMENTS

GB 2 036 203 11/1980

* cited by examiner

Primary Examiner—Tisha D Lewis
(74) Attorney, Agent, or Firm—Bliss McGlynn, P.C.; Greg Dziegielewski

(57) ABSTRACT

A method of controlling the torque transferred across each clutches of a dual clutch transmission during a gear shift. The method includes the steps including determining when a shift has been commanded, sensing the speed of the driven member of the off-going clutch, determining the desired clutch torque and slip profile for the changeover of the clutches, and sensing the speed of the driven member of the on-coming clutch to determine a target engine speed profile. The method simultaneously controls the torque transfer across each clutch by linearly decreasing the torque transferred across the off-going clutch while linearly increasing the torque transferred across the on-coming clutch in an inversely proportional rate. Finally, the pressure applied to the on-coming clutch is varied, to cause the engine to continue to track the target engine speed profile so that vehicle speed is maintained.

11 Claims, 11 Drawing Sheets

METHOD OF CONTROLLING A DUAL CLUTCH TRANSMISSION

BACKGROUND OF THE INVENTION

1. Field of the Invention

The present invention relates, generally to a method of controlling a dual clutch transmission and, more specifically, to a method for automatically controlling the gear shifting process by controlling the torque transfer of the clutches of a dual clutch transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch to engage and disengage the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. The disadvantages of the manual transmission is that there is an interruption in the drive connection during gear shifting and that there is a great deal of required physical interaction on the part of the operator to shift gears.

The second, and newer choice for the transmission of power in a conventional motor vehicle is an automatic transmission. First and foremost, automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween.

At low speed ratios, RPM output/RPM input, torque converters multiply or increase the torque translation from the engine. During torque multiplication, the output torque is greater than the input torque for the torque converter. However, at high speed ratios there is no torque multiplication and the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel which is generally considered to be unacceptable when compared to smooth shift feel associated with most conventional automatic transmissions.

To overcome this problem, other automated manual type transmissions have been developed which can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular variant types of automated manual transmissions have two clutches and are generally referred to simply as dual, or twin, clutch transmissions. The dual clutch structure is most of ten coaxially and cooperatively configured so as to derive power input from a singular engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two disc clutches each with their own clutch actuator to control the engagement and disengagement of the two-clutch discs independently. While the clutch actuators may be of the electro-mechanical type, since a lubrication system within the transmission is still a necessity requiring a pump, some dual clutch transmissions utilize hydraulic shifting and clutch control. These pumps are most of ten gerotor types, and arc much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform upshifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events to properly time and execute within the transmission to achieve smooth and efficient operation, not only during the power-shifting events, but also throughout the entire operating range of the transmission as well. To this point, conventional control schemes and methods have generally failed to provide this capability. Accordingly, there exists a need in the related art for better methods of controlling the operation of dual clutch transmissions.

One particular area of control improvement that is needed is in the power-shifting of the dual clutch transmission. As discussed above, power shifting is actually the automatic gear shifting process of the dual clutch transmission. The nature of the dual clutch transmission, that is, the manual style configuration discussed above that employs automatically actuated disc type clutches, requires accurate control of the clutch engagement and thus the torque transferred across them during the gear shifting process. More specifically, it is desirable to operate the clutches of the dual clutch transmission so that the automatic gear shifting process is smoothly and efficiently controlled by varying the amount of torque transferred across each clutch as the clutch driving the off-going gear is minimized and the clutch driving the on-coming clutch is maximized.

Control of the torque transferred across the clutches during the gear shifting process is required to provide smooth operation, avoid hard or noticeable lockup of the on-coming clutch to the transmission, and to provide efficient engine-to-transmission interaction during either upshifts or downshifts. The prior art dual transmission clutch control schemes are incapable of adequately providing for fine control of clutch torque transfer to satisfy this need. Current control methods do have the general capability to operate the clutches as needed. However, they lack the ability to finely control the torque transferred across the clutches to achieve the high degree of accuracy needed for smooth shifting between the gears of the transmission. Additionally, current control methods for the clutches of a dual clutch transmission generally concern themselves with simple engagement and disengagement of the clutch assemblies and fail to adequately provide for the corresponding control of all aspects of the shift process including engine speed control during the shift and the differences in upshifting and downshifting.

In that regard, some prior control methods for the gear shifting of dual clutch transmissions have attempted to overcome these inadequacies by using a control algorithm. For example, one known method provides an algorithm to control the movement of electrical clutch actuators, and thus the engagement of the clutches, to prevent torque interruption during upshifts of a dual clutch transmission. While the application of this particular algorithm is functionally adequate for its intended use, it still has certain drawbacks that leave room for improvement.

Particularly, while this and other known dual clutch transmission shifting approaches attempt to provide a power-shift in which there is no interruption of torque transfer, none of the current methods provides for a smooth and efficient torque transfer from one clutch to the other so that the shift and subsequent change in engine speed avoids a change in vehicle speed or is smooth enough to go unnoticed by the driver. For example, one existing control method applies its upshift algorithm so that, as the shift is performed, a swap of the engagement between the on-coming and off-going clutch is accomplished by increasing and decreasing the torque transferred across the respective clutches in such a manner as to follow exponential curves. This means that although no complete break or interruption in torque transfer occurs, the changeover in the clutches is non-linear so that the total torque transferred will vary as the clutches swap. The non-linear switchover of the clutches results in a total torque transfer that is uneven causing an uncontrolled change in engine speed resulting in a change in vehicle speed during the shift. This results in inefficient torque transfer and imparts poor ride characteristics to the vehicle.

Additionally, certain prior art methods utilize an engine performance map that predicts expected engine output torque and sets the clutch position based on those predictions so that this control method is reactive to predicted engine output. The drawback of this control approach is that a wide variety of variants that cannot be predicted can influence the engine torque output. These unpredicted variables can subsequently cause great inaccuracies in the control of the clutches. On the other hand, a more accurate approach would be to actively and directly control the torque transfer across clutches to effect the engine output.

Accordingly, there remains a need in the art for a method to operatively and actively control the gearshifts in a dual clutch transmission so that both upshifts and downshifts are efficiently and smoothly performed by providing control over the torque transfer of the clutches.

SUMMARY OF THE INVENTION

The disadvantages of the related art are overcome by the method of the present invention for controlling the engine speed of a vehicle having a dual clutch transmission. The method controls the torque transferred across each of the two clutches of a dual clutch transmission during a gear shift wherein the first of the two clutches is the off-going clutch and the second of the two clutches is the on-coming clutch. The method includes the steps of determining when a shift has been commanded and sensing the engine throttle position, the speed of the driven member of the off-going clutch, and the speed of the driven member of the on-coming clutch. The method then determines a target engine speed profile based on the engine throttle position, the speed of the driven member of the off-going clutch, and the speed of the driven member of the on-coming clutch. Once the target engine speed is determined, the method simultaneously controls the torque transfer across each clutch so that the torque output of the transmission will be changed over from the off-going clutch to the on-coming clutch by linearly decreasing the torque transferred across the off-going clutch while linearly increasing the torque transferred across the on-coming clutch in an inversely proportional rate to cause the engine to track the target engine speed profile. Then, the method varies the pressure applied to the on-coming clutch, once the on-coming clutch is transferring all of the output torque, to cause the engine to continue to track the target engine speed profile so that vehicle speed is maintained.

Thus, the method of the present invention controls the powershifts of the dual clutch transmission by controlling the torque transfer across the clutches in such a manner as to maintain vehicle speed during each shift event, albeit acceleration or deceleration and whether the vehicle and drivetrain are under negative or positive torque conditions. The method of the present invention considers and accounts for all the situations encountered when shifting the dual clutch transmission and thereby overcomes the inability of prior methods to control the engine and clutch speeds so that the speed and momentum of the vehicle are not interrupted. This is a substantial improvement over the prior methods of dual clutch shift control, which do not consider all the various conditions and situations in which a shift may occur. Furthermore, the shifts are also accomplished smoothly and efficiently so that there is no hard or distinctive "feel" to the shift, thereby improving overall drivability and comfort of the vehicle. The smooth shifting of the dual clutch transmission is provided by the linear and inversely proportional change over from the off-going clutch to the on-coming clutch and the supplement varying of the clutch pressures to maintain the speed of the vehicle during shifting.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
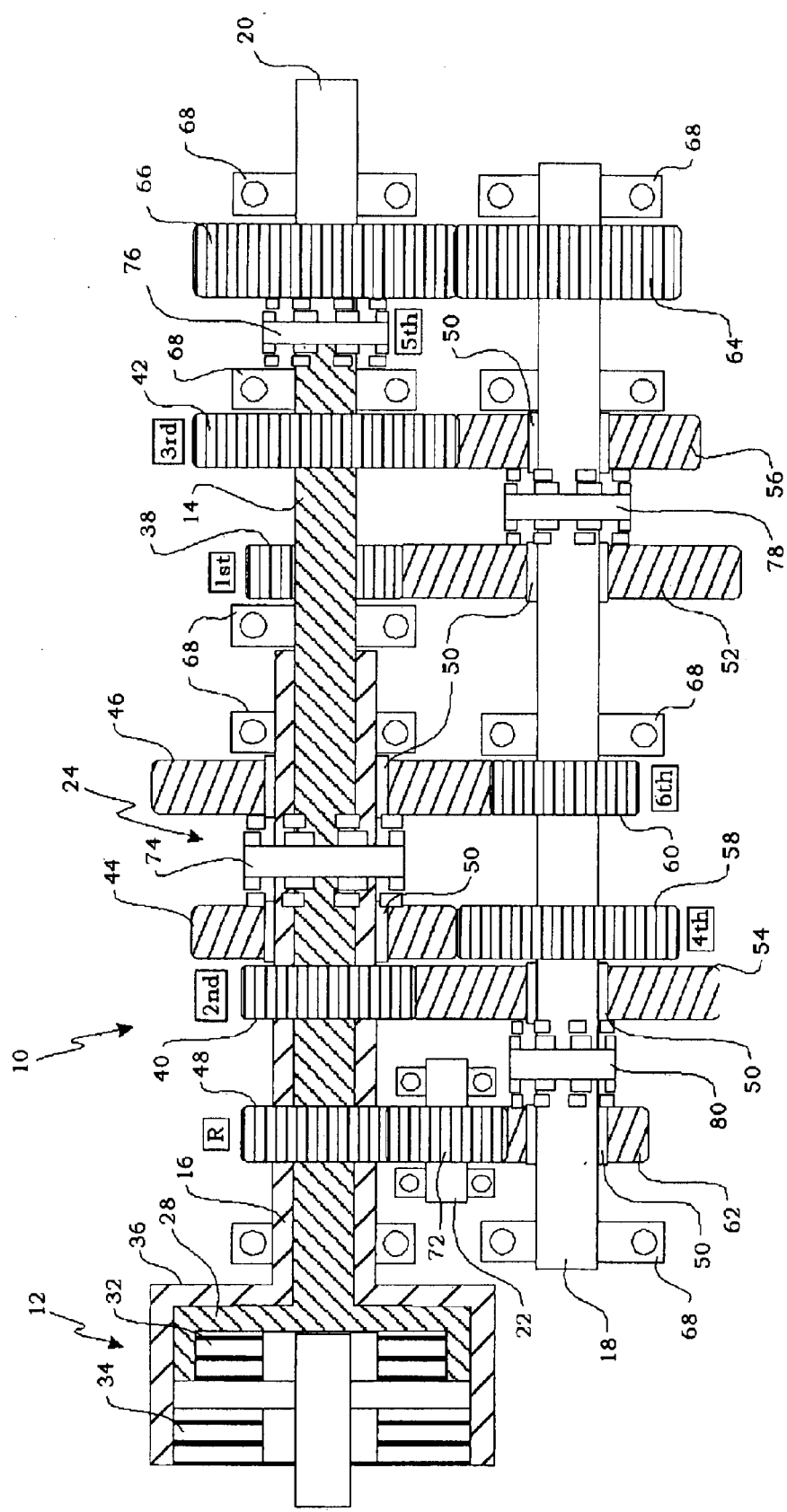
FIG. 1 is a generalized schematic illustration of a dual clutch transmission that may be controlled by the method of the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators (not shown) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54,56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

In the preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center neutralized position to the right and engage another gear to its shaft when moved to the left.

It should be appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions. Thus, the control method of the present invention as described below may be a standalone process or merely a portion, such as a sub-routine, or series of sub-routines, of a larger control scheme within the ECU.

The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is effected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches and the resultant engine speed. Of particular concern to this application is the speed control routine that causes the engine speed to track a predetermined target speed for given input parameters by varying the applied engagement pressure across the clutch discs. In that regard, the actuating components of the first and second clutch mechanisms 32 and 34 are not shown and it should be appreciated there may be of any number of suitable known devices that are capable of selectively varying the applied engagement pressure between the clutch discs, such as, but not limited to mechanical actuators, hydromechanical actuators, electromechanical actuators, or fully electrical actuators.

For example, in one embodiment of the dual clutch transmission 10, the first and second clutch mechanisms 32 and 34 of the dual, coaxial clutch assembly 12 are actuated by hydraulic pressure supplied by the first and second clutch actuator solenoids, respectively. The clutch actuator solenoids are schematically represented, and generally indicated at 120 and 122 in FIG. 2, and as shown, are supplied with pressurized hydraulic fluid by a regulating circuit generally indicated at 82. It should be appreciated that, as previously mentioned, the actuation of the components of the dual clutch transmission 10 may be electrical rather than electro-hydraulic, and in that case, the first and second clutch actuator solenoids 120, 122 would be replaced by some type of physical drive devices to operatively engage the first and second clutch mechanisms 32 and 34.

Figure 2:
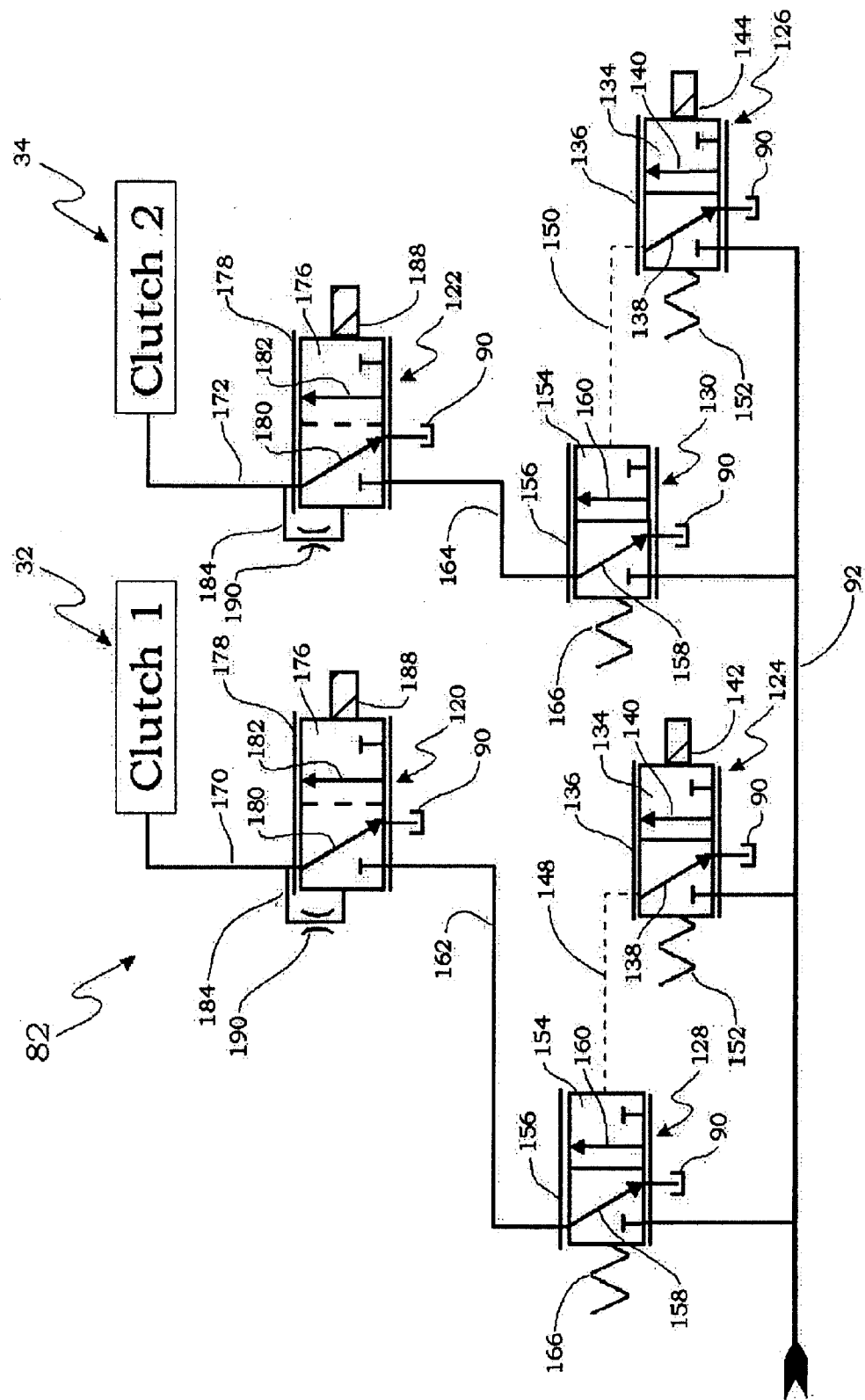
FIG. 2 is a schematic illustration of the electro-hydraulic control circuit for the clutch actuators of a dual clutch transmission that may be controlled by the method of the present invention.

As shown in FIG. 2, for this example of a dual clutch transmission 10, there are two on/off solenoids, generally indicated at 124 and 126, and two enable valves, generally indicated at 128 and 130 that provide the operative hydraulic pressure to the clutch actuator solenoids 120 and 122. A main pressure supply line 92 that is operatively connected to a source of pressurized hydraulic fluid from a pump within the transmission 10 (not shown) provides the two on/off solenoids 124 and 126 with pressurized hydraulic fluid. The on/off solenoids 124 and 126 each have a selectively movable valve member 134 disposed within a valve body 136 that has internal hydraulic flow passages 138 and 140. When energized, the valve members 134 of the on/off solenoids 124 and 126 are driven to the left, as illustrated, by actuators 142 and 144 respectively. The on/off solenoids 124 and 126 then selectively provide hydraulic pressure though pressure lines 148 and 150 to act upon the right sides of enable valves 128 and 130, as illustrated in FIG. 2. In their normally de-energized state, biasing member 152 causes the valve member 134 to be driven back to the right and any residual pressure in pressure lines 148 or 150 is bled off and routed back to the fluid sump, shown at 90.

The enable valves 128 and 130 also each have a selectively movable valve member 154 disposed within a valve body 156 that has internal hydraulic flow passages 158 and 160. The applied hydraulic pressure from the on/off solenoids 124 and 126 act to push the valve members 154 of the enable valves 128 and 130 to the left to open the internal hydraulic passage 158 and provide hydraulic pressure to clutch actuator solenoid 120 and 122 through the pressure supply lines 160 and 162. In their normally de-energized state biasing member 166 causes the valve member 154 to be driven back to the right and any residual pressure in pressure lines 160 or 162 is bled off and routed back to the fluid sump, shown at 90.

Though beyond the scope of this invention and not shown here, the two enable valves 128 and 130 are also in fluid communication with, and hydraulically feed, the synchronizer actuator solenoids that drive the synchronizers 24 of the transmission 10 between their engaged and neutralized positions. Thus, it should be appreciated that two on/off solenoids 124 and 126, and two enable valves 128 and 130 also have other hydraulic switching functions within the transmission 10, such that the on/off solenoids 124 and 126 are selectively operable to provide and remove hydraulic actuating pressure and prevent uncontrolled actuation of the mechanisms within the transmission 10.

When the on/off solenoids 124 and 126 are actuated and the enable valves 128 and 130 have charged the pressure supply lines 162 and 164 to the clutch actuator solenoids 120 and 122, the first and second clutch mechanisms, generally indicated at 32 and 34, are controllable. The clutch actuator solenoids 120 and 122 are in fluid communication with the clutch mechanisms 32 and 34 through clutch pressure lines 170 and 172 respectively. Each of the clutch actuator solenoids 120 and 122 have a selectively movable valve member 176 disposed within a valve body 178 that has internal hydraulic flow passages 180 and 182. The clutch actuator solenoids 120 and 122 also have external hydraulic feedback passages 184. A solenoid 188 selectively drives the valve member 176 operatively from its de-energized position biased to the left as illustrated in FIG. 2 to its energized position which allows the flow of pressurized hydraulic fluid to flow through internal passage 182 out the clutch pressure line 170, 172 to the clutch 32, 34.

The clutch actuator solenoids 120 and 122 are current controlled, variable regulating valves, such that a given control current applied to solenoids 188 will result in a particular pressure output in the clutch pressure lines 170, 172. Regulation of the clutch actuator solenoids 120, 122 is further provided by the pressure feedback through passages 184. Similar to the on/off solenoids 124 and 126 and the enable valves 128 and 130, the clutch actuator solenoids 120 and 122 have internal passages 180 to send residual pressure from the clutch pressure lines 170 and 172 back to the sump 90 when the solenoid is de-energized.

Figure 3:
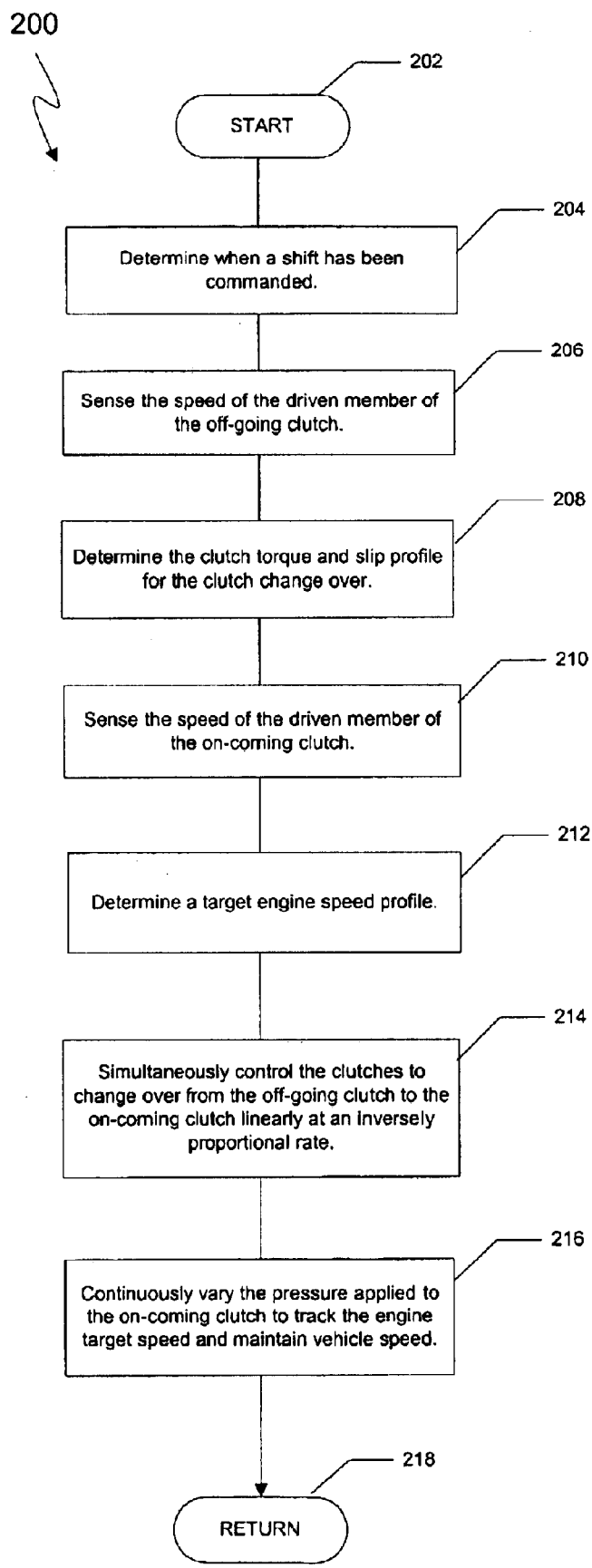
FIG. 3 is a block diagram flowchart of the method of the present invention for controlling a dual clutch transmission during a shift event.

The method of the present invention is generally indicated at 200 in FIG. 3 and controls the torque transferred across each of the two clutches of a dual clutch transmission during a gear shift, wherein the first of the two clutches is the off-going clutch and the second of the two clutches is the on-coming clutch. Thus, the method operatively controls the shifting process by controlling the torque transfer across the clutches 32 and 34 of the dual clutch transmission 10 for either a downshift or an upshift. The method begins at the start entry block 202 and includes the steps of determining when a shift has been commanded at process block 204, sensing the speed of the driven member of the off-going clutch at process block 206, determining the desired clutch torque/slip profile for the changeover of clutches during the shift at process block 208, and sensing the speed of the driven member of the on-coming clutch at process block 210.

The determination of the desired clutch torque/slip profile is based on the application of any one of a variety of torque/slip profiles, which may be maintained in a lookup table or otherwise stored in accessible memory within an ECU. These torque/slip profiles are predetermined and are mathematically expressed as the change in clutch torque and slip over time. Different profiles may be used in different situations and for different gear changes. The profiles are derived based on the generally shift "feel" that is desired. However, it has been determined that the most desirable clutch torque/slip profile for the dual clutch transmission is the one which provides a linear ramp up and ramp down of the respective clutches. The linear profile provides a smooth and efficient transition from the off-going clutch to the on-coming clutch.

A target engine speed profile is then determined at process block 212 based on the off-going clutch speed, the clutch torque/slip profile, and the on-coming clutch speed. The method then simultaneously controls the torque transfer across each clutch so that the torque output of the transmission will be changed over from the off-going clutch to the on-coming clutch by linearly decreasing the torque transferred across the off-going clutch while linearly increasing the torque transferred across the on-coming clutch in an inversely proportional rate to follow the clutch torque and slip profile (process block 208) and cause the engine to track the target engine speed profile at process block 214. In other words, the total torque for the clutch changeover is determined and as each clutch is controlled independently, the total torque is linearly apportioned between each clutch during the changeover. Then at process block 216, the method varies the pressure applied to the on-coming clutch, once the on-coming clutch is transferring all of the output torque, to cause the engine to continue to track the target engine speed profile so that vehicle speed is maintained More specifically, if the transmission is performing an upshift operation in response to an engine throttle position that is causing positive torque to occur, then the vehicle is accelerating or in a positively driven steady state. Positive torque is generated when the engine is providing power, and thus torque, to the transmission and drive train. Therefore, maintaining vehicle speed in this sense actually means maintaining the same rate of acceleration during the upshift so that the gear change is not felt by the occupant of the vehicle. Likewise, if a downshift is being performed in response to a lowered engine throttle position causing negative torque to occur, then the vehicle is decelerating. Negative torque is generated when the vehicle is slowing such that the vehicle's inertia, as delivered through the transmission, exceeds the torque provided by the engine so that the transmission is attempting to drive the engine. Maintaining vehicle speed in this sense actually means maintaining the same rate of deceleration during the downshift so that the gear change is not felt by the occupant of the vehicle. These two shifting situations are the ones that occur most commonly. In the first situation, the vehicle is accelerating (positive torque) and the transmission is upshifting through the gears in response. In the second situation, the engine throttle is reduced and the vehicle is decelerating (negative torque) so that the transmission would be downshifting in response. Referring to FIG. 3, when the shift is completed and either the vehicle acceleration or deceleration is maintained at process step 216, then the method of the present invention exits at step 218.

When discussing a target engine speed profile that is used to control the engagement of the clutches to regulate the speed of the engine, and thus the vehicle during the shift, the term "target engine speed" and its associated concepts may take on a number of connotations in common practice and the terminology used here should be clearly understood. In general use, the phrase "target engine speed" may be used in an "engine speed control" scheme or strategy. The term "engine speed control" as used herein means holding the engine to a specific speed (RPM), or limiting the engine to a specific speed, or controlling the engine speed (and thus, its acceleration) over its operating range. Thus, engine speed control using a target engine speed may use a target that is either a static point, or involve dynamic control. In this case, during the shift activity of the transmission, the method of the present invention provides target engine speeds that are in actuality constantly changing, or dynamic. Target engine speed profiles are based on the clutch speeds and the desired slip across the clutches. Thus, the engine speed is caused to track the target engine speed profile by the control of the torque transfer across the clutches of the dual clutch transmission.

In operation, once the ECU, or other control device, makes a determination (by some other set of control parameters beyond the scope of this invention) that a shift is required, the method of the present invention is initiated. More specifically, and by way of non-limiting examples, the method steps generally indicated in FIG. 3 may include those depicted in detail in FIGS. 4–7. As previously mentioned, there are two general conditions of torque transfer across an engaged clutch that involve either positive or negative torque. Positive torque exists where the engine is providing power to the remainder of the drive train and negative torque exists where the inertia of the vehicle is providing greater energy to the drivetrain than the engine so that the transmission is attempting to drive the engine. It should be appreciated that a neutral torque condition may also exist where neither the engine nor the vehicle drivetrain are imparting a transfer of torque to one another. However, with the vehicle moving such that a shift may be necessary, this condition is likely very transient with no appreciable impact on the shift actions of the transmission. As such, it will not be considered herein.

In the course of vehicle operation, the transmission will be called upon to upshift or downshift when either positive or negative torque is occurring. Thus, four particular shifting situations exist. In addition to the two shifting situations mentioned above (positive torque upshift and negative torque downshift), a positive torque downshift and a negative torque upshift may also be encountered. Generally speaking, a positive torque downshift will most likely occur in a vehicle "accelerate to pass" condition. This is where the engine throttle position is set to cause the engine and vehicle to accelerate or maintain a speed but it is desirable to rapidly accelerate to pass another vehicle. In this case, the engine throttle position will be maximized causing a commanded downshift to the next lower gear in an attempt to immediately increase the engine speed to place it in a higher torque generating RPM range.

The negative torque upshift most of ten occurs when the vehicle is traveling downhill and the engine throttle position is reduced so that the vehicle is coasting and its inertia exceeds the engine torque output. In this case, the negative torque from the drive train and transmission is driving the engine causing it to increase in speed. In some situations this is effectively "engine braking" and may be a desired effect. However, if the braking effect becomes excessive so that the engine is driven undesirably high into its RPM range an upshift may be commanded, which will cause the transmission to shift into the next higher gear so that the engine is driven at a lesser speed. It should be appreciated that the conditions described above concerning the necessity for any particular shifting situation within the dual clutch transmission are used in an illustrative manner and other conditions may also exist that would precipitate like responses from the transmission.

Figure 4:
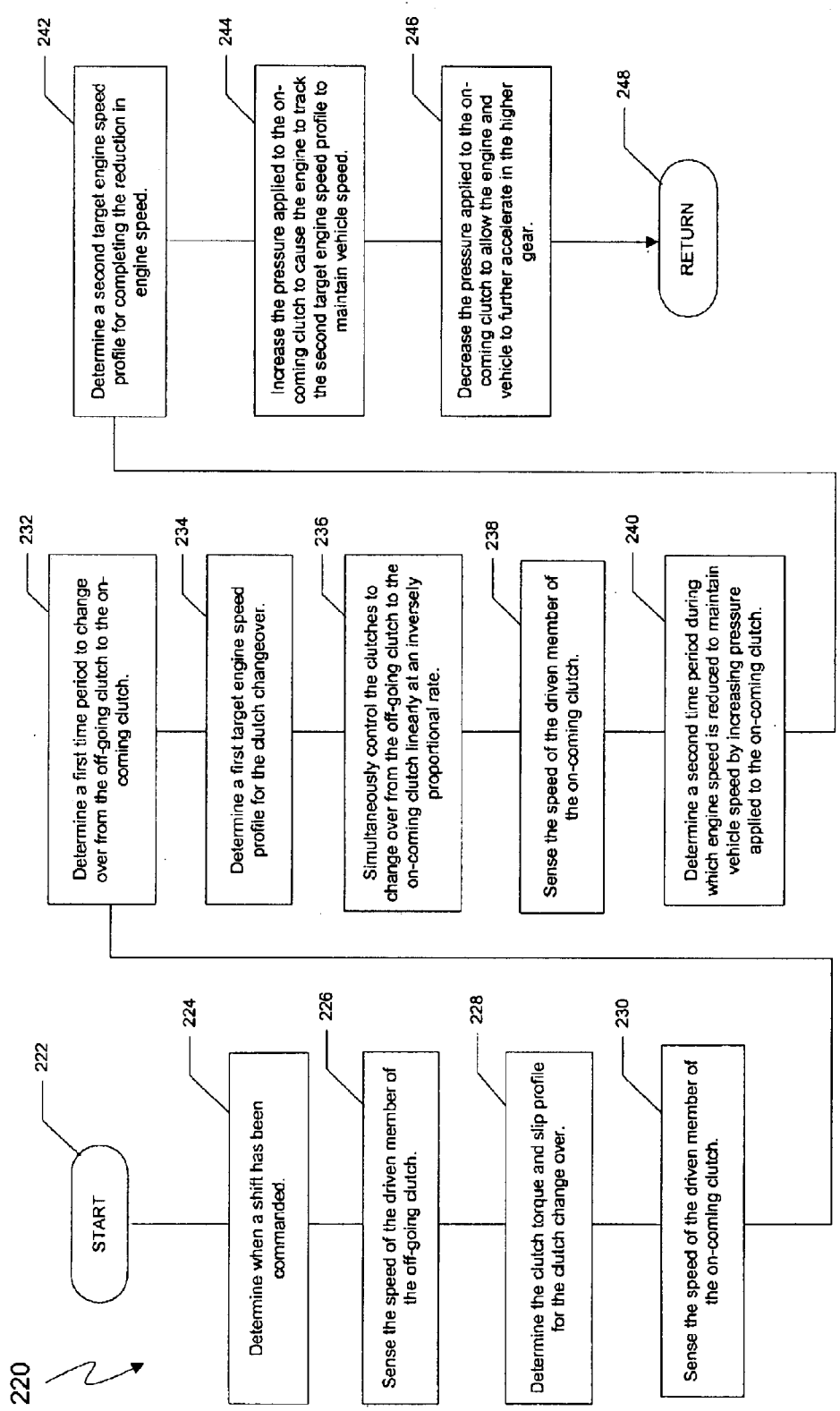
FIG. 4 is a block diagram flowchart of the method of the present invention for controlling a dual clutch transmission during a positive torque upshift event.

FIG. 4 depicts the additional method steps required to perform a positive torque upshift and that are distinctive from the other types of shifts. This portion of the method of the present invention is generally indicated at 220. Once initialized at the start block 222, the method steps move to process block 224, which determines that a shift has been properly commanded, then to process block 226 to sense the speed of the driven member of the off-going clutch, to process block 228 to determine the desired clutch torque/slip profile for the changeover of clutches during the shift at process block, and to process block 230 to sense the speed of the driven member of the on-coming clutch. These values are used at process block 232 to determine a first time period during which the torque output of the transmission will be changed over from the off-going clutch to the on-coming clutch based on the clutch speeds and the clutch torque and slip profile. It should be appreciated that the reference to clutch speed throughout this specification is taken to simply mean the rotational speed of the driven member of the particular clutch assembly being discussed.

Once the first time period is determined, a first target engine speed profile is determined based on the speed of the driven member of the on-coming clutch (process block 230) and the length of the first time period (process block 232) for completing the clutch change over at process block 234. After the determination of the first time period and first target engine speed, the torque transfer across each clutch is simultaneously controlled so that the torque transferred across the off-going clutch is linearly decreased while the torque transferred across the on-coming clutch is linearly increased at an inversely proportional rate to follow the clutch torque and slip profile (process block 228) and to cause the engine to track the target engine speed profile (process block 234) during the first time period (process block 232) at process block 236. Once the on-coming clutch is transferring all of the output torque in the higher gear, its speed is sensed again at process block 238. Then, a second time period is determined during which the engine speed will be reduced and vehicle speed maintained by increasing the pressure applied to the on-coming clutch at process block 240. At process block 242, a second target engine speed profile is determined based on the speed of the on-coming clutch and the length of the second time period for completing the reduction in engine speed.

The method steps continue at process block 244 in which the pressure applied to the on-coming clutch is increased to cause the engine to track the second target engine speed profile so that vehicle speed is maintained in the higher gear. This occurs due to the fact that as the clutch pressure is increased, the torque transferred to the drivetrain increases and this increase of torque transfer across the clutch pulls down the speed of the accelerating engine. Since the vehicle is accelerating under positive torque and the transmission is upshifting through the gears in response to the acceleration, maintaining vehicle speed in this sense actually means maintaining the same rate of acceleration during the upshift so that the gear change is not felt. Finally, at process block 246 the pressure applied to the on-coming clutch is decreased a small predetermined amount to allow the engine and vehicle to further accelerate in the higher gear in continued response to the engine throttle position once the engine and engaged clutch speeds are essentially equal. When these steps are completed and the vehicle continues to accelerate in the higher gear, the method of the present invention exits at step 248.

Figure 8:
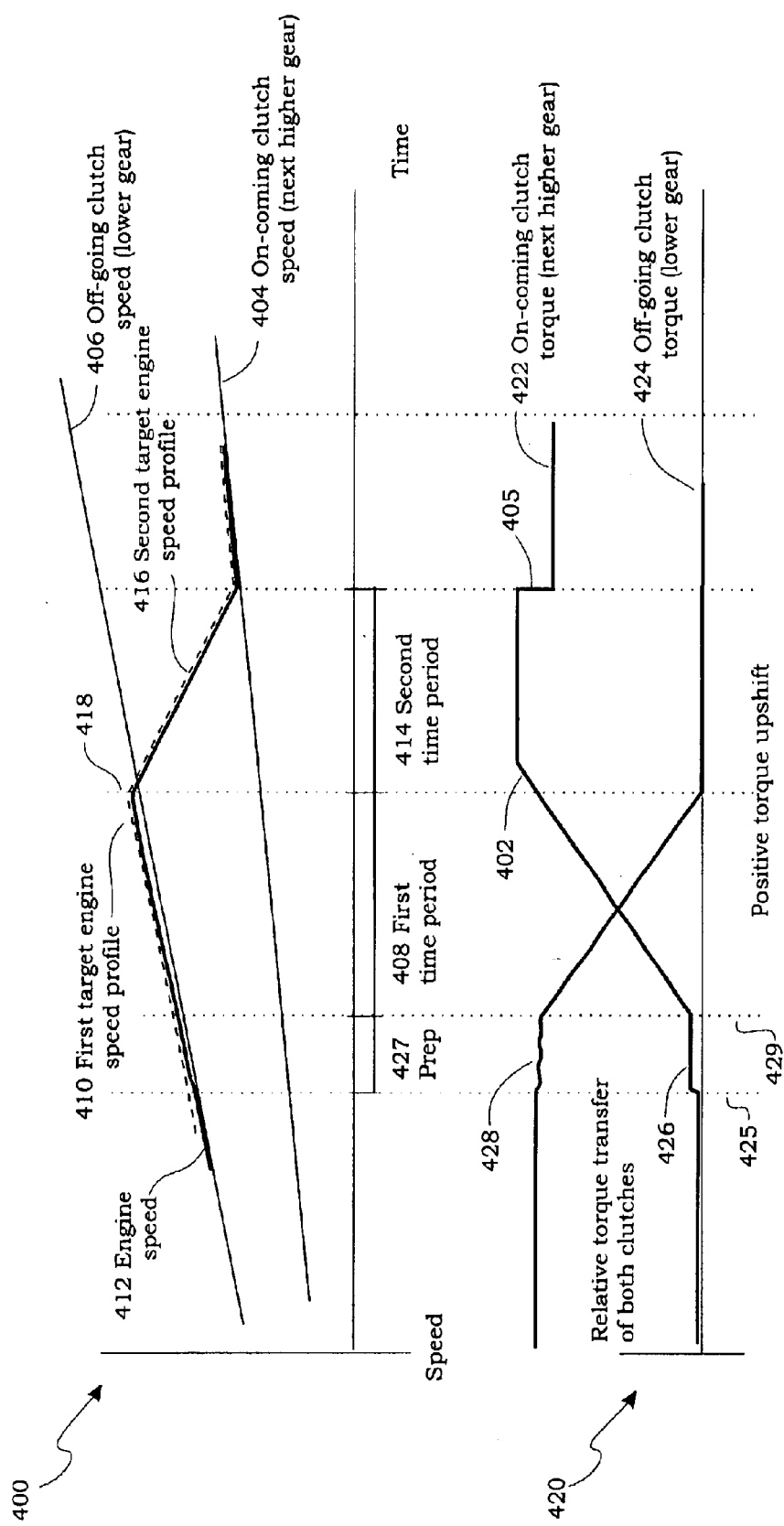
FIG. 8 is a representative graph of the method of the present invention for controlling a dual clutch transmission of the engine speed and clutch torque transfer over time during a positive torque upshift event.

The method of the present invention and its interrelation to the control of the torque transfer across the two clutches of the dual clutch transmission during the shift event is graphically illustrated in FIG. 8. A graph of the relative speeds of the two clutches versus a relative time line is generally indicated at 400 and a graph of the relative level of torque transfer of the two clutches versus the same relative time scale is generally indicated at 420. In the positive torque upshift, as described above, the generally increasing speed of the on-coming clutch is shown as line 404 and the generally increasing but much higher relative increasing speed of the off-going clutch is shown as line 406. The positive torque upshift will cause the delivery of the output torque of the engine to be changed over from the clutch driving the lower gear to the clutch driving the higher gear. Therefore, as the first time period at 408 and the first target engine speed profile at 410 are determined (process blocks 232 and 234, FIG. 4), the engine speed 412 is caused to track the first target engine speed profile 410. This occurs as the simultaneous linear clutch change over (process block 236, FIG. 4) takes place. This is illustrated by the change in the on-coming and off-going clutch torque lines 422 and 424 of 420 (FIG. 8) during the first time period 408.

Then, the second time period at 414 and a second target engine speed profile at 416 are determined (process blocks 240 and 242, FIG. 4), which causes the engine speed 412 to track the second target engine speed profile 416. The second target engine speed profile 416 and the subsequent change in engine speed is shown in FIG. 8 as decreasing due to process block 244 (FIG. 4) increasing the clutch pressure to draw the engine speed down to meet the rising of the on-coming clutch 404. The increased clutch pressure causes greater torque transfer, shown at 402 in FIG. 8, so that as engine speed decreases the increased torque transfer continues to maintain the acceleration of the vehicle. Finally, process block 246 (FIG. 4) decreases the clutch pressure of the now fully engaged on-coming clutch so that the engine and vehicle will continue the acceleration as the engine and clutch speed become equal. This is shown in FIG. 8 at 405 where the control of the on coming clutch torque 422 exits the second time period 414.

Figure 5:
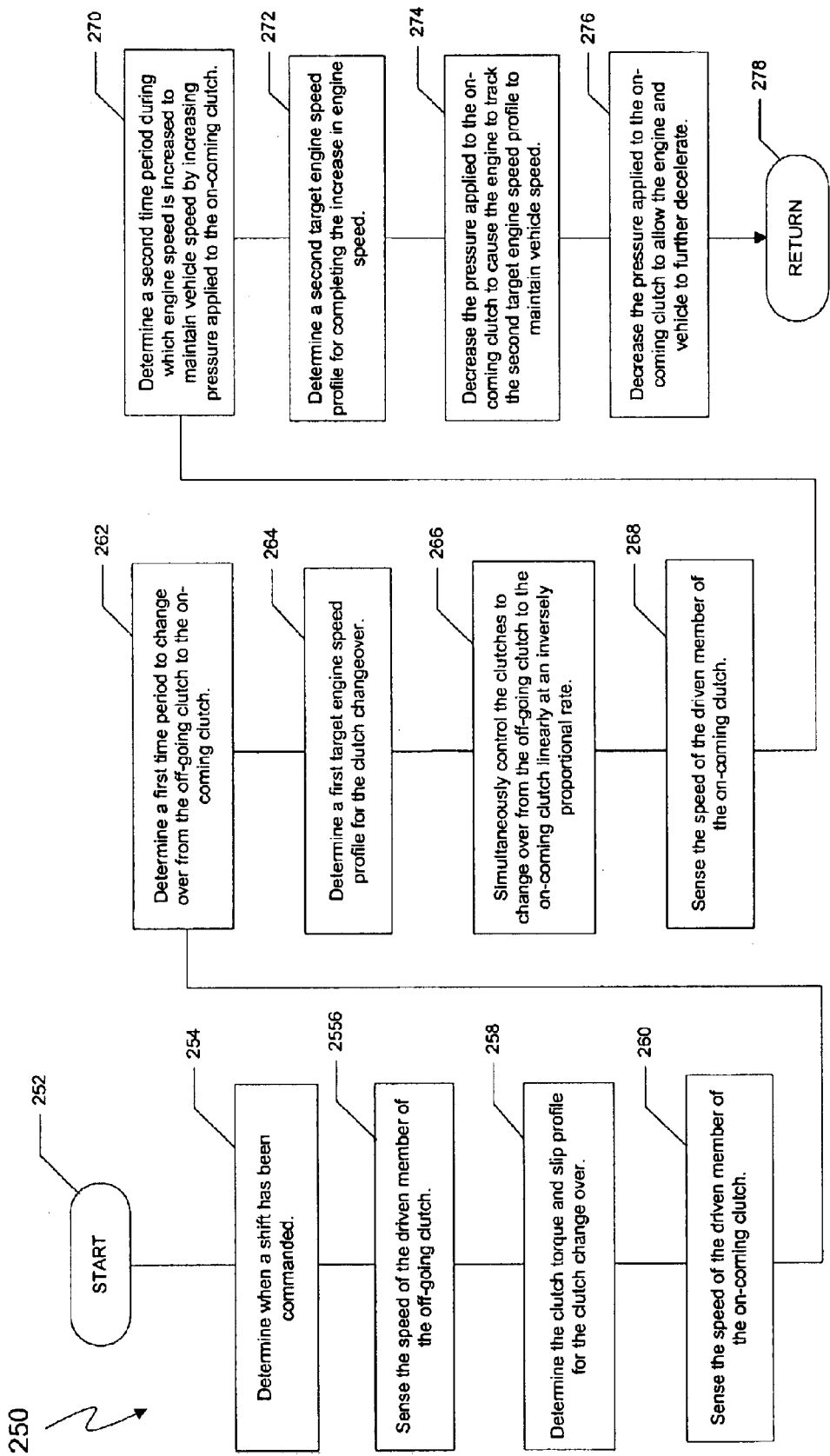
FIG. 5 is a block diagram flowchart of the method of the present invention for controlling a dual clutch transmission during a negative torque downshift event.

FIG. 5 depicts the additional method steps required when operating conditions call for a negative torque downshift that are distinctive from the other types of shifts. This portion of the method of the present invention is generally indicated at 250. Once initialized at the start block 252, the method steps move to process block 254, which determines that a shift has been properly commanded, then to process block 256 to sense the speed of the driven member of the off-going clutch, to process block 258 to determine the desired clutch torque/slip profile for the changeover of clutches during the shift, and to process block 260 to sense the speed of the driven member of the on-coming clutch. These values are used at process block 262 to determine a first time period during which the torque output of the transmission will be changed over from the off-going clutch to the on-coming clutch based on the clutch speeds and the clutch torque and slip profile.

Once the first time period is determined, a first target engine speed profile is determined based on the speed of the driven member of the on-coming clutch (process block 260) and the length of the first time period (process block 262) for completing the clutch change over at process block 264.

After the determination of the first time period and first target engine speed, the torque transfer across each clutch is simultaneously controlled so that the torque transferred across the off-going clutch is linearly decreased while the torque transferred across the on-coming clutch is linearly increased at an inversely proportional rate to cause the engine to track the target engine speed profile (process block 264) during the first time period (process block 262) at process block 266 to follow the clutch torque and slip profile (process block 258) and to cause the engine to track the first target engine speed profile during the time period thereby maintaining the vehicle deceleration during the clutch changeover.

Once the on-coming clutch is transferring all of the output torque in the lower gear, its speed is sensed again at process block 268. Then, a second time period is determined at process block 270 during which the engine speed will be increased to maintain the deceleration in vehicle speed by increasing the pressure applied to the on-coming clutch. Then at process block 272, a second target engine speed profile is determined based on the speed of the on-coming clutch and the length of the second time period for completing the increase in engine speed. The method steps continue at process block 274 in which the pressure applied to the on-coming clutch is decreased to cause the engine to track the second target engine speed profile so that vehicle speed is further reduced in the lower gear. The increase of clutch pressure allows the negative torque from the drive train to speed the engine to meet the decreasing yet higher relative speed of the on-coming clutch. Then as process block 276, the pressure applied to the on-coming clutch is decreased a predetermined amount to allow the engine and vehicle to further decelerate in the lower gear in response to the engine throttle position once the engine and engaged clutch speeds are essentially equal. As previously discussed, since the vehicle is decelerating under negative torque and the transmission is downshifting through the gears in response to the deceleration, maintaining vehicle speed in this sense actually means maintaining the same rate of deceleration during the downshift so that the gear change is not felt by the vehicle occupants. When these steps are completed and the vehicle continues to decelerate in the lower gear, the method of the present invention exits at step 278.

Figure 9:
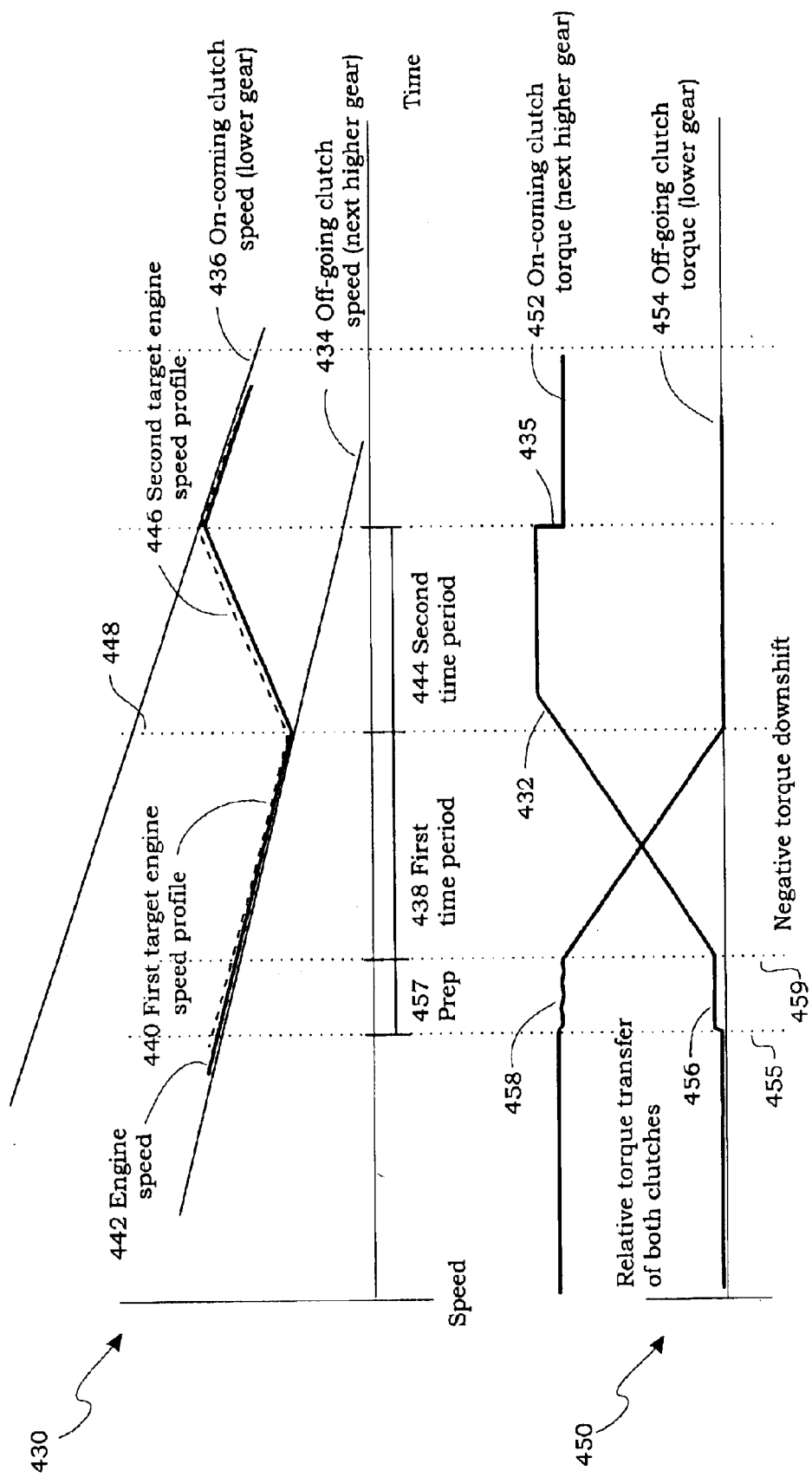
FIG. 9 is a representative graph of the method of the present invention for controlling a dual clutch transmission of the engine speed and clutch torque transfer over time during a negative torque downshift event.

The method of the present invention and its interrelation to the control of the torque transfer across the two clutches of the dual clutch transmission during the negative torque downshift event is graphically illustrated in FIG. 9. A graph of the relative speeds of the two clutches versus a relative time line is generally indicated at 430 and a graph of the relative level of torque transfer of the two clutches versus the same relative time scale is generally indicated at 450. In the negative torque downshift, as described above, the generally decreasing speed of the off-going clutch is shown as line 434 and the generally decreasing but much higher relative decreasing speed of the on-coming clutch is shown as line 436. The negative torque downshift will cause the delivery of the output torque of the engine to be changed over from the clutch driving the higher gear to the clutch driving the next lower gear. Therefore, as the first time period at 438 and the first target engine speed profile at 440 are determined (process blocks 262 and 264, FIG. 5), the engine speed 442 is caused to track the first target engine speed profile 440. This occurs as the simultaneous linear clutch change over takes place (process block 266, FIG. 5), which is illustrated by the change in the on-coming and off-going clutch torque lines 452 and 454 of 450 (FIG. 9) during the first time period 438.

Then, the second time period at 444 and a second target engine speed profile at 446 are determined (process blocks 270 and 272, FIG. 5), which causes the engine speed 442 to track the second target engine speed profile 446. The second target engine speed profile 446 and the subsequent change in engine speed is shown in FIG. 9 as increasing due to process block 247 (FIG. 5) increasing the clutch pressure to allow the negative torque from the drive train to speed the engine to meet the decreasing yet higher relative speed of the on-coming clutch 436. The increased clutch pressure causes greater torque transfer, shown at 432 in FIG. 9 so that as engine speed is driven higher the increased torque transfer continues to maintain the deceleration of the vehicle. Finally, process block 276 (FIG. 5) decreases the clutch pressure of the now fully engaged on-coming clutch so that the engine and vehicle will continue the deceleration as the engine and clutch speed become equal. This is shown in FIG. 9 at 435 where the control of the on-coming clutch torque 452 exits the second time period 444.

Figure 6:
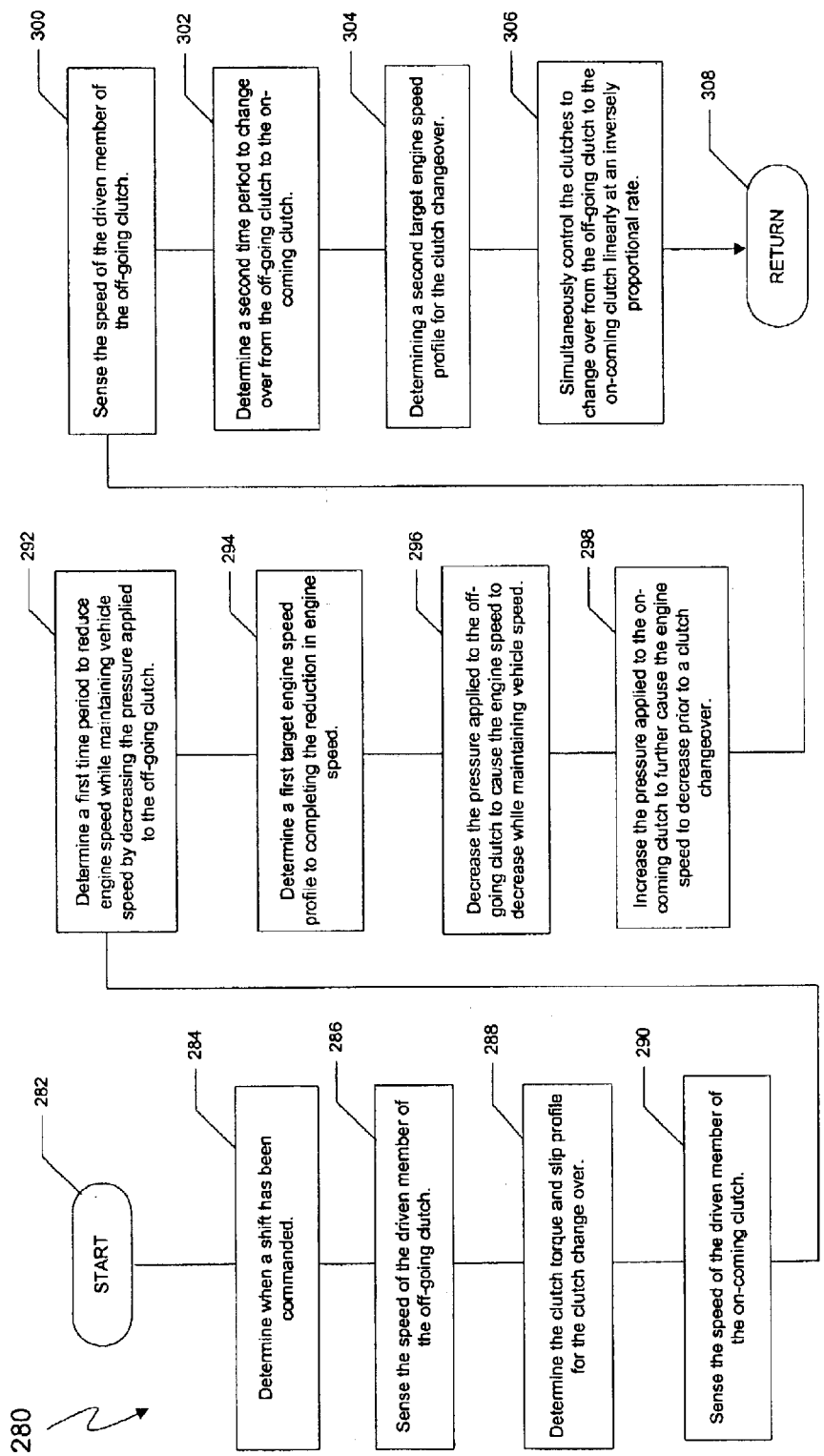
FIG. 6 is a block diagram flowchart of the method of the present invention for controlling a dual clutch transmission during a negative torque upshift event.

FIG. 6 depicts the additional method steps required when operating conditions call for a negative torque upshift that are distinctive from the other types of shifts. This portion of the method of the present invention is generally indicated at 280. Once initialized at the start block 282, the method steps move to process block 284, which determines that a shift has been properly commanded, then to process block 286 to sense the speed of the driven member of the off-going clutch, to process block 288 to determine the desired clutch torque/slip profile for the changeover of clutches during the shift, and to process block 290 to sense the speed of the driven member of the on-coming clutch. These values are used at process block 292 to determine a first time period during which the engine speed will be reduced to maintain vehicle speed by decreasing the pressure applied to the off-going clutch.

Once the first time period is determined, a first target engine speed profile is determined based on the speed of the off-going clutch and the length of the first time period for completing the reduction in engine speed at process block 294. Then at process block 296, the pressure applied to the off-going clutch is decreased to cause the engine to track the first target engine speed profile while the vehicle speed is maintained in the current gear. At process block 298, the pressure applied to the on-coming clutch is increased a small predetermined amount to further cause the engine speed to decrease prior to a clutch changeover to the higher gear. Once the engine speed has been decreased by the on-coming clutch, the speed of the off-going clutch is sensed at process block 300.

A second time period is determined at process block 302 during which the torque output of the transmission will be changed over from the off-going clutch to the on-coming clutch based on the clutch speeds and the clutch torque and slip profile. Once the second time period is determined, a second target engine speed profile based on the speed of the driven member of the on-coming clutch (300) and the length of the second time period (302) for completing the clutch change over is determined at process block 304. After the determination of the second time period and second target engine speed, process block 306 causes the torque transfer across each clutch to be simultaneously controlled so that the torque transferred across the off-going clutch is linearly decreased while the torque transferred across the on-coming clutch is linearly increased at an inversely proportional rate to follow the clutch torque and slip profile (process block 288) and to cause the engine to track the second target engine speed profile during the second time period thereby maintaining the decreasing vehicle speed. When these steps are completed and the vehicle continues to decelerate in the lower gear, the method of the present invention exits at step 308.

Figure 10:
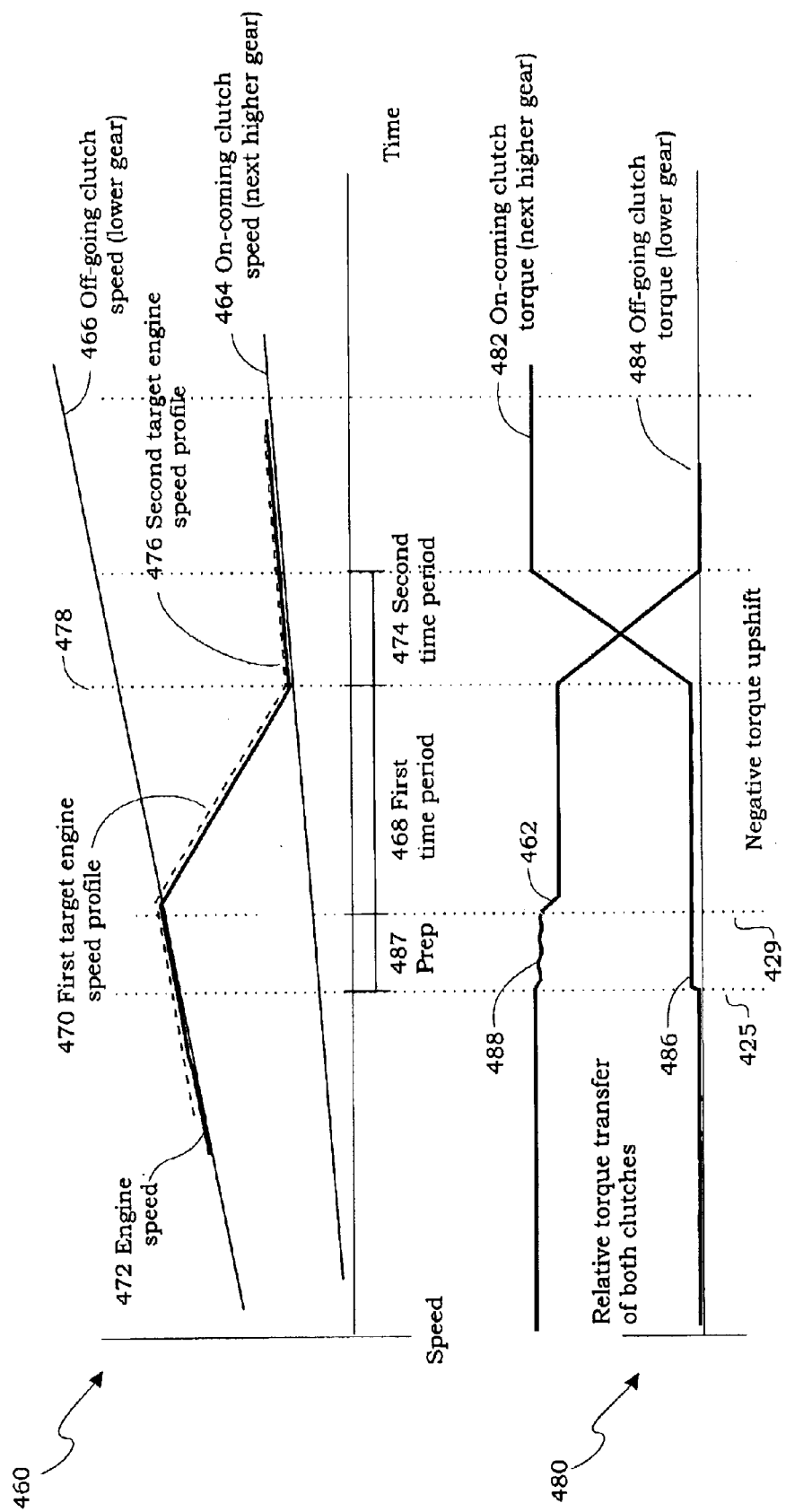
FIG. 10 is a representative graph of the method of the present invention for controlling a dual clutch transmission of the engine speed and clutch torque transfer over time during a negative torque upshift event.

The method of the present invention and its interrelation to the control of the torque transfer across the two clutches of the dual clutch transmission during the negative torque upshift event is graphically illustrated in FIG. 10. A graph of the relative speeds of the two clutches versus a relative time line is generally indicated at 460 and a graph of the relative level of torque transfer of the two clutches versus the same relative time scale is generally indicated at 480. In the negative torque upshift, as described above, the generally increasing speed of the on-coming clutch is shown as line 464 and the generally increasing but much higher relative increasing speed of the off-going clutch is shown as line 466. The negative torque upshift will cause the delivery of the output torque of the engine to be changed over from the clutch driving the lower gear to the clutch driving the higher gear. Therefore, as the first time period at 468 and the first target engine speed profile at 470 are determined (process blocks 292 and 294, FIG. 6), the engine speed 472 is caused to track the first target engine speed profile 470. This occurs as the pressure applied to the off-going clutch is decreased (process block 296, FIG. 6) thereby allowing the engine speed to decrease, and the pressure applied to the on-coming clutch is increased a small predetermined amount to further draw down the engine speed. These changes are shown by the linear change to the off-going clutch torque line 484 at 462 and the change to the on-coming clutch torque line 482 at 486 (FIG. 10) during the first time period 468.

Then, the second time period at 474 and a second target engine speed profile at 476 are determined (process blocks 302 and 304, FIG. 6), which causes the engine speed 472 to track the second target engine speed profile 476. During the second time period 474, the simultaneous clutch change over takes place (process block 306, FIG. 6), which is shown by the linear change in the on-coming and off-going clutch torque lines 482 and 484 of 480 (FIG. 10) during the second time period 474. As the on-coming clutch is brought on, the second target engine speed profile, and thus the engine speed, is allowed to increase from its newly lowered relative value as the clutch and engine speed become essentially equal. This occurs because the vehicle is upshifting in a negative torque situation to avoid having the drivetrain excessively drive the engine in the lower gear and upshifts in response.

Figure 7:
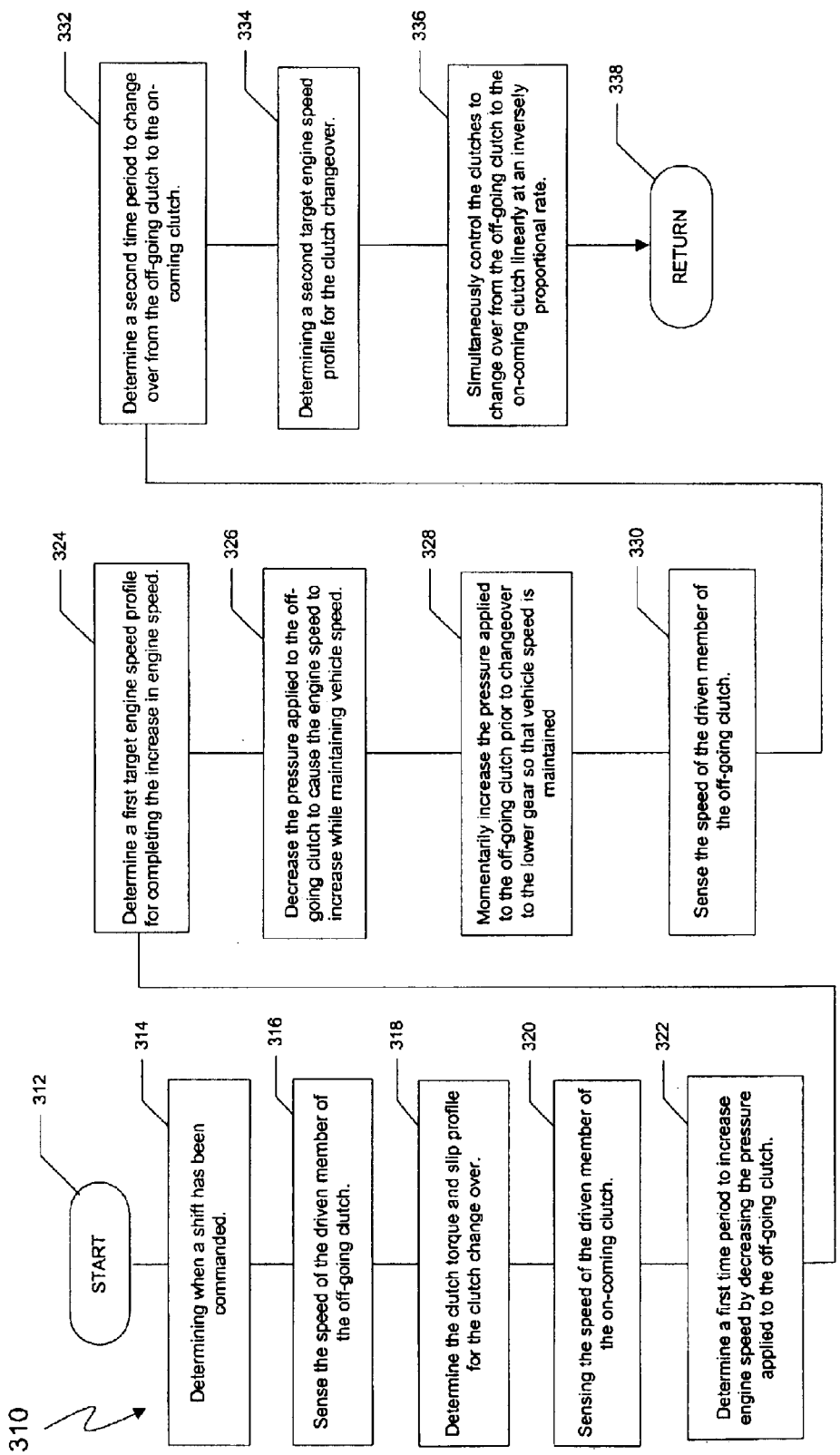
FIG. 7 is a block diagram flowchart of the method of the present invention for controlling a dual clutch transmission during a positive torque downshift event.

FIG. 7 depicts the additional method steps required when operating conditions call for a positive torque downshift that are distinctive from the other types of shifts. This portion of the method of the present invention is generally indicated at 310. Once initialized at the start block 312, the method steps move to process block 314, which determines that a shift has been properly commanded, then to process block 316 to sense the speed of the driven member of the off-going clutch, to process block 318 to determine the desired clutch torque/slip profile for the changeover of clutches during the shift, and to process block 320 to sense the speed of the driven member of the on-coming clutch. These values are used at process block 322 to determine a first time period during which the engine speed will be increased by decreasing the pressure applied to the off-going clutch.

Once the first time period is determined, a first target engine speed profile is determining based on the speed of the off-going clutch and the length of the first time period for completing the increase in engine speed at process block 324. Then at process block 326, the pressure applied to the off-going clutch is decreased to cause the engine speed to increase and track the first target engine speed profile in preparation to shift from higher gear to lower gear while maintaining the increasing vehicle speed. At process block 328, the pressure applied to the off-going clutch is momentarily increased a predetermined amount to provide the maximum torque available in the higher gear at the end of the first time period immediately prior to a changeover to the lower gear so that the increasing vehicle speed is maintained. Once the engine speed has been decreased by the on-coming clutch at 328, the speed of the off-going clutch is sensed at process block 330.

A second time period is then determined at process block 332 during which the torque output of the transmission is changed over from the off-going clutch to the on-coming clutch based on the clutch speeds and the clutch torque and slip profile. Once the second time period is determined, a second target engine speed profile is determined based on the speed of the driven member of the on-coming clutch and the length of the second time period for completing the clutch change over. After the determination of the second time period and second target engine speed, process block 336 causes the torque transfer across each clutch to be simultaneously controlled so that the torque transferred across the off-going clutch is linearly decreased while the torque transferred across the on-coming clutch is linearly increased at an inversely proportional rate to follow the clutch torque and slip profile (process block 318) and to cause the engine to track the second target engine speed profile during the second time period thereby maintaining the increasing vehicle speed. When these steps are completed and the vehicle continues to accelerate in the lower gear, the method of the present invention exits at step 338.

Figure 11:
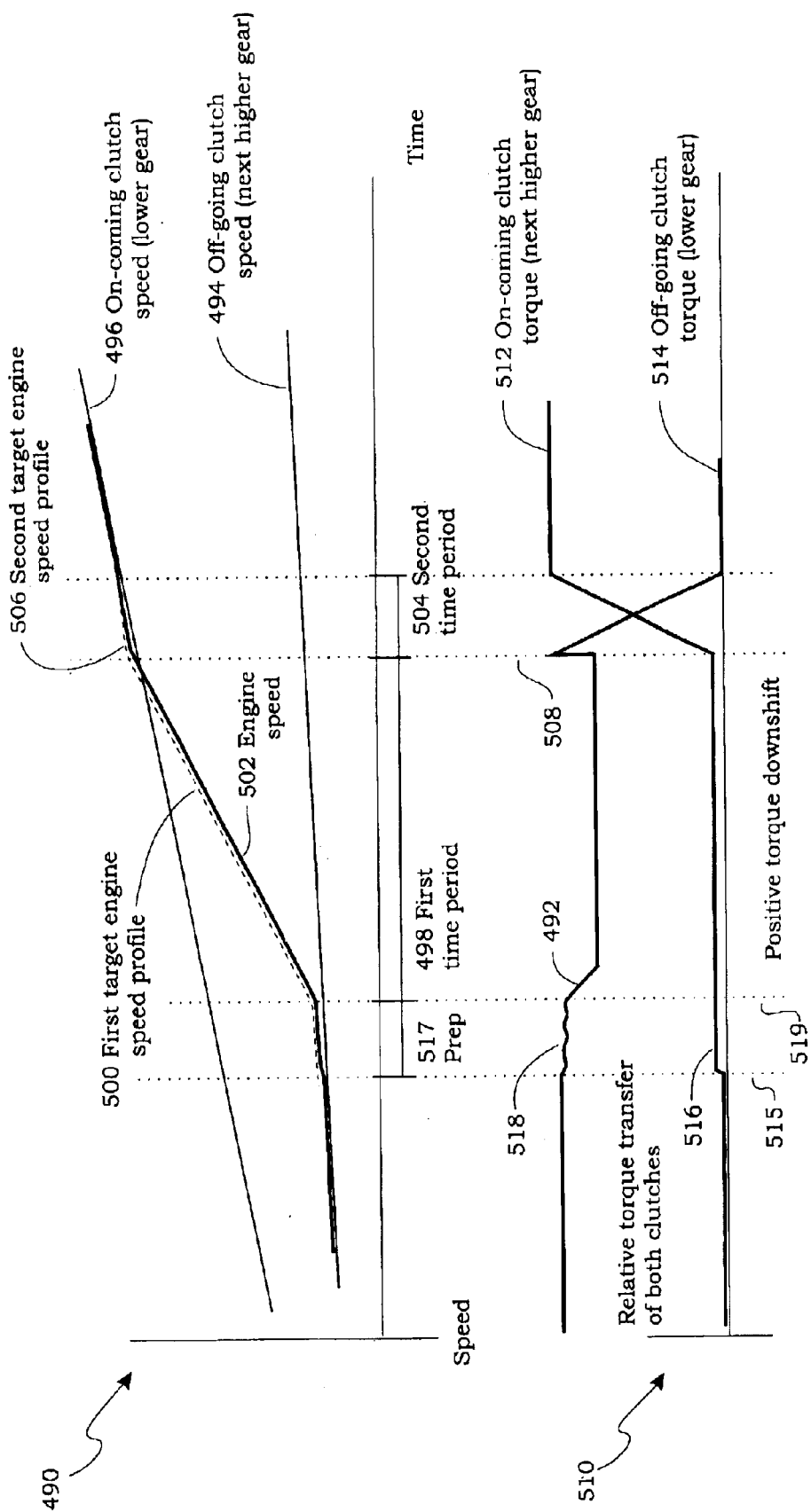
FIG. 11 is a representative graph of the method of the present invention for controlling a dual clutch transmission of the engine speed and clutch torque transfer over time during a positive torque downshift event.

The method of the present invention and its interrelation to the control of the torque transfer across the two clutches of the dual clutch transmission during the positive torque downshift event is graphically illustrated in FIG. 11. A graph of the relative speeds of the two clutches versus a relative time line is generally indicated at 496 and a graph of the relative level of torque transfer of the two clutches versus the same relative time scale is generally indicated at 510. In the positive torque downshift, as described above, the generally increasing speed of the off-going clutch is shown as line 494 and the generally increasing but much higher relative increasing speed of the on-coming clutch is shown as line 496. The positive torque downshift will cause the delivery of the output torque of the engine to be changed over from the clutch driving the higher gear to the clutch driving the next lower gear. Therefore, as the first time period at 498 and the first target engine speed profile at 500 are determined (process blocks 322 and 324, FIG. 7), the engine speed 502 is caused to track the first target engine speed profile 500. This occurs as the pressure applied to the off-going clutch is decreased (process block 326, FIG. 7) thereby allowing the engine speed to increase, and the pressure applied to the on-coming clutch is also increased a small predetermined amount to aid in controlling the engine speed and to increase the speed on the on-coming clutch. These changes are shown by the linear change to the off-going clutch torque line 514 at 492 and the change to the on-coming clutch torque line 512 at 516 (FIG. 11) during the first time period 498.

Then, the second time period at 504 and a second target engine speed profile at 506 are determined (process blocks 332 and 334, FIG. 7), which causes the engine speed 502 to track the second target engine speed profile 506. During the second time period 504, the simultaneous linear clutch change over takes place (process block 326, FIG. 7), which is illustrated by the change in the on-coming and off-going clutch torque lines 512 and 514 of 510 (FIG. 11) during the second time period 504. As the on-coming clutch is brought on, the second target engine speed profile, and thus the engine speed, is allowed to continue to increase from its newly increased relative value as the clutch and engine speed become essentially equal. This occurs because the vehicle is downshifting in a positive torque situation to accelerate the vehicle through lower gears.

It should be appreciated that during each gearshift event, as the torque output is about to change from one clutch to the other, a preparatory portion of the shift event must be accomplished. Thus, the method of the present invention provides for the additional steps of performing a preparatory clutch pressure fill without a transfer of torque to the on-coming clutch and performing a predetermined nominal reduction in the pressure applied to the off-going clutch to cause a slight slip in preparation of disengaging the off-going clutch. These preparatory steps occur immediately prior to the first time period in each of the shifting situations. As shown in FIG. 8, the preparatory period 427 starts at vertical line 425 with the pressure fill of the on-coming clutch 426 and the nominal reduction of pressure to the off-going clutch 428. It continues until the beginning of the first time period 408 at vertical line 429. Likewise, the same preparatory steps occur in the other shifting situations and are illustrated in FIGS. 9, 10, and 11. In FIG. 9, the preparatory steps as shown as 456 and 458, which occur during the preparatory period 457 between vertical lines 455 and 459. In FIG. 10, the preparatory steps as shown as 486 and 488, which occur during the preparatory period 487 between vertical lines 485 and 489. In FIG. 11, the preparatory steps as shown as 516 and 518, which during occur the preparatory period 517 between vertical lines 515 and 519.

Additionally, it should be appreciated by those having ordinary skill in the art that the method of the present invention is also capable of controlling combinations of the above described shifting situations. For example, if a vehicle having a dual clutch transmission is accelerating and a positive torque upshift is commanded, it is possible for the driver to concurrently release the vehicle's throttle to a lower position in which a deceleration is required. In this situation, it is possible that the positive torque upshift may have only completed the clutch changeover of the first time period before the torque changes to negative and a negative downshift is commanded. In this manner, the method of the present invention is capable of moving immediately from the first time period of the positive upshift to the first time period of the negative downshift, if necessary, to control this combined shift event. Thus, it can be seen that the method is also operable to move between the various shifting situations as dynamically required by the operation of the vehicle.

Therefore, the method of the present invention overcomes the drawbacks and disadvantages of all prior dual clutch transmission shift control methods by providing smooth and efficient shifting of the dual clutch transmission. The method of the present invention provides linear and inversely proportional changeovers from the off-going clutch to the on-coming clutch and varies the clutch pressures to maintain the speed of the vehicle during shifting. This improves overall drivability and comfort of the vehicle when compared with prior methods, which use a non-linear changeover of the clutches that cause uncontrolled changes in engine and vehicle speed that results in inefficient torque transfer and poor ride characteristics during the shift.

Additionally, the method of the present invention overcomes the drawbacks of prior methods by directly and operatively controlling the torque transfer across the clutches of the dual clutch transmission. In this manner, the method of the present invention considers and accounts for the wide variety of variants that influence the vehicle during the shift event.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A method of controlling torque transferred across each of the two clutches of a dual clutch transmission during a gear shift, wherein the first of the two clutches is an off-going clutch and the second of the two clutches is an on-coming clutch, said method includes the steps of:

determining when a shift has been commanded;

sensing the speed of a driven member of the off-going clutch;

determining a desired clutch torque and slip profile for the changeover of the clutches;

sensing the speed of a driven member of the on-coming clutch;

determining a target engine speed profile based on the speed of the driven member of the off-going clutch, the clutch torque and slip profile, and the speed of the driven member of the on-coming clutch;

simultaneously controlling the torque transfer across each clutch so that a torque output of the transmission will be changed over from the off-going clutch to the on-coming clutch by linearly decreasing the torque transferred across the off-going clutch while linearly increasing the torque transferred across the on-coming clutch in an inversely proportional rate to follow the clutch torque and slip profile and to cause the engine to track the target engine speed profile; and varying the pressure applied to the on-coming clutch, once the on-coming clutch is transferring all of the output torque, to cause the engine to continue to track the target engine speed profile so that vehicle speed is maintained.

2. A method of controlling the torque transferred across each of the two clutches of a dual clutch transmission as set forth in claim 1 wherein the transmission is performing an upshift during a positive torque application, said method further includes the steps of:

determining a first time period during which the torque output of the transmission will be changed over from the off-going clutch to the on-coming clutch based on the clutch speeds and the clutch torque and slip profile;

determining a first target engine speed profile based on the speed of the driven member of the on-coming clutch and a length of the first time period for completing the clutch change over; and simultaneously controlling the torque transfer across each clutch so that the torque transferred across the off-going clutch is linearly decreased while the torque transferred across the on-coming clutch is linearly increased at an inversely proportional rate to follow the clutch torque and slip profile and to cause the engine to track the target engine speed profile during the first time period thereby maintaining a vehicle acceleration during the changeover.

3. A method of controlling the torque transferred across each of the two clutches of a dual clutch transmission as set forth in claim 2 wherein the transmission is performing an upshift during a positive torque application, said method further including the steps of:

determining a second time period once the on-coming clutch is transferring all of the output torque in a higher gear during which the engine speed is reduced and vehicle speed is maintained by increasing the pressure applied to the on-coming clutch;

determining a second target engine speed profile based on the speed of the on-coming clutch and a length of the second time period for completing the reduction in engine speed;

increasing the pressure applied to the on-coming clutch to cause the engine to track the second target engine speed profile so that vehicle speed is maintained in the higher gear; and decreasing the pressure applied to the on-coming clutch a predetermined amount to allow the engine and vehicle to further accelerate in the higher gear in response to an engine throttle position once the engine and engaged clutch speeds are essentially equal.

4. A method of controlling the torque transferred across each of the two clutches of a dual clutch transmission as set forth in claim 1 wherein the transmission is performing a downshift during a negative torque application, said method further including the steps of:

determining a first time period during which the torque output of the transmission will be changed over from the off-going clutch to the on-coming clutch based on the clutch speeds and the clutch torque and slip profile;

determining a first target engine speed profile based on the speed of the driven member of the on-coming clutch and a length of the first time period for completing the clutch change over; and simultaneously controlling the torque transfer across each clutch so that the torque transferred across the off-going clutch is linearly decreased while the torque transferred across the on-coming clutch is linearly increased at an inversely proportional rate to follow the clutch torque and slip profile and to cause the engine to track the first target engine speed profile during the first time period thereby maintaining a vehicle deceleration during the clutch changeover.

5. A method of controlling the torque transferred across each of the two clutches of a dual clutch-transmission as set forth in claim 4 wherein the transmission is performing a downshift during a negative torque application, said method further including the steps of:

determining a second time period once the on-coming clutch is transferring all of the output torque in a higher gear during which the engine speed will be increased to maintain vehicle speed by decreasing the pressure applied to the on-coming clutch;

determining a second target engine speed profile based on the speed of the on-coming clutch and a length of the second time period for completing the increase in engine speed;

increasing the pressure applied to the on-coming clutch to cause the engine to track the second target engine speed profile so that vehicle speed is further reduced in a lower gear; and decreasing the pressure applied to the on-coming clutch a predetermined amount to allow the engine and vehicle to further decelerate in the lower gear in response to an engine throttle position once the engine and engaged clutch speeds are essentially equal.

6. A method of controlling the torque transferred across each of the two clutches of a dual clutch transmission as set forth in claim 1 wherein the transmission is performing an upshift having a negative torque application, said method further including the steps of:

determining a first time period during which the engine speed will be reduced to maintain vehicle speed by decreasing the pressure applied to the off-going clutch;

determining a first target engine speed profile based on the speed of the off-going clutch and a length of the first time period for completing the reduction in engine speed;

decreasing the pressure applied to the off-going clutch to cause the engine speed to decrease and track the first target engine speed profile while maintaining vehicle speed in a current gear; and increasing the pressure applied to the on-coming clutch a small predetermined amount to further cause the engine speed to decrease prior to a clutch changeover to a higher gear.

7. A method of controlling the torque transferred across each of the two clutches of a dual clutch transmission as set forth in claim 6 wherein the transmission is performing an upshift having a negative torque application, said method further includes the steps of:

determining a second time period during which the torque output of the transmission will be changed over from the off-going clutch to the on-coming clutch based on the clutch speeds and the clutch torque and slip profile;

determining a second target engine speed profile based on the speed of the driven member of the on-coming clutch and a length of the second time period for completing the clutch change over; and simultaneously controlling the torque transfer across each clutch so that the torque transferred across the off-going clutch is linearly decreased while the torque transferred across the on-coming clutch is linearly increased at an inversely proportional rate to follow the clutch torque and slip profile and to cause the engine to track the second target engine speed profile during the second time period thereby maintaining the decreasing vehicle speed.

8. A method of controlling the torque transferred across each of the two clutches of a dual clutch transmission as set forth in claim 1 wherein the transmission is performing a downshift having a positive torque application, said method further including the steps of:

determining a first time period during which the engine speed will be increased by decreasing the pressure applied to the off-going clutch;

determining a first target engine speed profile based on the speed of the off-going clutch and a length of the first time period for completing the increase in engine speed;

decreasing the pressure applied to the off-going clutch to cause the engine speed to increase and track the first target engine speed profile in preparation to shift from higher gear to lower gear while maintaining the increasing vehicle speed; and momentarily increasing the pressure applied to the off-going clutch a predetermined amount to provide a maximum torque available in the higher gear at the end of the first time period immediately prior to a changeover to the lower gear so that the increasing vehicle speed is maintained.

9. A method of controlling the torque transferred across each of the two clutches of a dual clutch transmission as set forth in claim 8 wherein the transmission is performing a downshift having a positive torque application, said method further including the steps of:

determining a second time period during which the torque output of the transmission will be changed over from the off-going clutch to the on-coming clutch based on the clutch speeds and the clutch torque and slip profile;

determining a second target engine speed profile based on the speed of the driven member of the on-coming clutch and a length of the second time period for completing the clutch change over; and simultaneously controlling the torque transfer across each clutch so that the torque transferred across the off-going clutch is linearly decreased while the torque transferred across the on-coming clutch is linearly increased at an inversely proportional rate to follow the clutch torque and slip profile and to cause the engine to track the target engine speed profile during the second time period thereby maintaining the increasing vehicle speed.

10. A method of controlling torque transferred across each of the two clutches of a dual clutch transmission when the transmission is performing an upshift during an application of positive torque and wherein the first of the two clutches is an off-going clutch and the second of the two clutches is an on-coming clutch, said method includes the steps of:

determining when a shift has been commanded;

performing a preparatory clutch pressure fill without a transfer of torque to the on-coming clutch;

performing a predetermined nominal reduction in the pressure applied to the off-going clutch to cause a slight slip in preparation of disengaging the off-going clutch;

sensing the speed of a driven member of the off-going clutch;

determining a desired clutch torque and slip profile for the changeover of the clutches;

performing a predetermined nominal increase to the pressure applied to the on-coming clutch to cause a slight torque transfer across the on-coming clutch;

sensing the speed of a driven member of the on-coming clutch;

determining a first time period during which a torque output of the transmission is changed over from the off-going clutch to the on-coming clutch based on an engine throttle position and the speed of the driven member the off-going clutch;

determining a first target engine speed profile based on the speed of the driven member of the on-coming clutch and a length of the first time period for completing the clutch change over;

simultaneously controlling the torque transfer across each clutch so that the torque transferred across the off-going clutch is linearly decreased while the torque transferred across the on-coming clutch is linearly increased at an inversely proportional rate to follow the clutch torque and slip profile and to cause the engine to track the target engine speed profile during the first time period;

determining a length of a second time period, once the on-coming clutch is transferring all of the output torque in a higher gear, during which the engine speed will be reduced to maintain vehicle speed by increasing the pressure applied to the on-coming clutch;

determining a second target engine speed profile based on the speed of the on-coming clutch and the length of the second time period for completing the reduction in engine speed;

increasing the pressure applied to the on-coming clutch to cause the engine to track the second target engine speed profile so that vehicle speed is maintained in the higher gear; and decreasing the pressure applied to the on-coming clutch a small predetermined amount to allow the engine and vehicle to further accelerate in the higher gear in response to the engine throttle position once the engine and engaged clutch speeds are essentially equal.

11. A method of controlling a torque transferred across each of the two clutches of a dual clutch transmission during a downshift during an application of negative torque, wherein the first of the two clutches is an off-going clutch and the second of the two clutches is an on-coming clutch, said method includes the steps of:

determining when a shift has been commanded;

performing a preparatory clutch pressure fill without a transfer of torque to the on-coming clutch;

performing a predetermined nominal reduction in the pressure applied to the off-going clutch to cause a slight slip in preparation of disengaging the off-going clutch;

sensing the speed of a driven member of the off-going clutch;

determining a desired clutch torque and slip profile for the changeover of the clutches;

performing a predetermined nominal increase to the pressure applied to the on-coming clutch to cause a slight torque transfer across the on-coming clutch;

sensing the speed of a driven member of the on-coming clutch;

determining a length of a first time period during which a torque output of the transmission will be changed over from the off-going clutch to the on-coming clutch based on the clutch speeds and the clutch torque and slip profile;

determining a first target engine speed profile based on the speed of the driven member of the on-coming clutch and the length of the first time period for completing the clutch change over; and simultaneously controlling the torque transfer across each clutch so that the torque transferred across the off-going clutch is linearly decreased while the torque transferred across the on-coming clutch is linearly increased at an inversely proportional rate to follow the clutch torque and slip profile and to cause the engine to track the first target engine speed profile during the first time period;

determining a length of a second time period, once the on-coming clutch is transferring all of the output torque in a higher gear, during which the engine speed will be increased to maintain vehicle speed by decreasing the pressure applied to the on-coming clutch;

determining a second target engine speed profile based on the speed of the on-coming clutch and the length of the second time period for completing the increase in engine speed;

increasing the pressure applied to the on-coming clutch to cause the engine to track the second target engine speed profile so that vehicle speed is further reduced in a lower gear.

* * * * *